United States Patent [19]

Herman

[11] 4,055,199
[45] Oct. 25, 1977

[54] NOZZLE SEAL

[75] Inventor: Richard Frederick Herman, North Canton, Ohio

[73] Assignee: The United States of America as represented by the United States Energy Research and Development Administration, Washington, D.C.

[21] Appl. No.: 583,488

[22] Filed: June 3, 1975

[51] Int. Cl.² .......................................... E03B 11/00
[52] U.S. Cl. .................................... 137/590; 176/50; 176/87; 277/149
[58] Field of Search ................... 137/590; 176/50, 87; 277/26, 149, 150

[56] References Cited

U.S. PATENT DOCUMENTS

| 2,867,458 | 1/1959 | Kroekel | 277/149 |
| 2,997,435 | 8/1961 | Millar et al. | 176/87 |
| 3,469,862 | 9/1969 | Conibeer | 277/26 |
| 3,488,067 | 1/1970 | Sommer | 176/87 |
| 3,850,796 | 5/1972 | Thome | 176/87 |

Primary Examiner—William R. Cline
Assistant Examiner—H. Jay Spiegel
Attorney, Agent, or Firm—J. M. Maguire; R. G. Erdley

[57] ABSTRACT

In an illustrative embodiment of the invention, a nuclear reactor pressure vessel, having an internal hoop from which the heated coolant emerges from the reactor core and passes through to the reactor outlet nozzles, is provided with sealing members operatively disposed between the outlet nozzle and the hoop. The sealing members are biased against the pressure vessel and the hoop and are connected by a leak restraining member establishing a leak-proof condition between the inlet and outlet coolants in the region about the outlet nozzle. Furthermore, the flexible responsiveness of the seal assures that the seal will not structurally couple the hoop to the pressure vessel.

5 Claims, 3 Drawing Figures

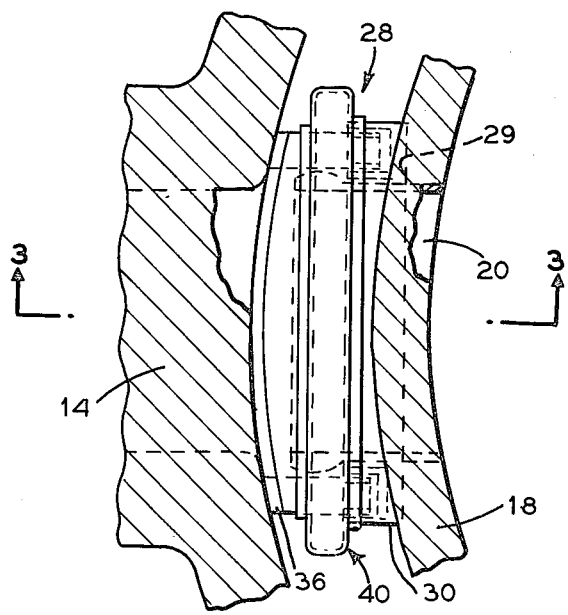
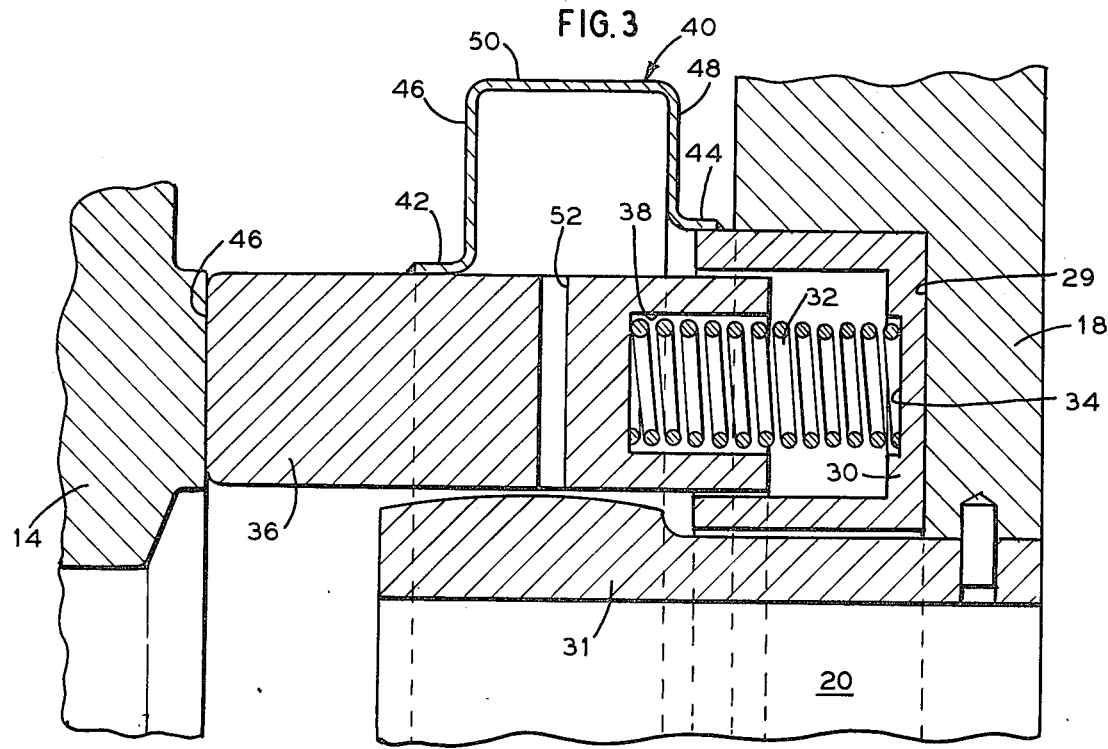

NOZZLE SEAL

BACKGROUND OF THE INVENTION

1. Field of the Invention

The present invention is directed to pressure vessels and more particularly to a nuclear reactor pressure vessel nozzle seal.

2. Description of the Prior Art

The conventional nuclear reactor pressure vessel comprises a longitudinally disposed cylindrical structure, closed at both ends by a convex base and a domed roof, having reactor coolant inlet and outlet nozzles protruding therethrough. Generally, these nozzles are disposed in a plane transverse to the longitudinal axis of the vessel and angularly separated from each other. Housed within the pressure vessel structure are, among others, the nuclear core, subassemblies and a fluid coolant. Moreover, within the pressure vessel, an annular flange is formed on the inner surface thereof. The flange serves as a means for supporting the reactor core which is suspended from a distribution hoop or shell.

The distribution hoop is extended by means of a thermal shield-skirt assembly, which supports the fuel elements in the reactor core and which also serves as a hydraulic guide.

In operation, the fluid coolant, in forced circulation, enters the pressure vessel through the inlet nozzles, and flows through the annular hydraulic guide that is formed between the inner surface of the pressure vessel and the skirt. The coolant then rises through the core of the reactor whereupon it is discharged from the vessel through an outlet nozzle which is in fluid communication with the hoop opening through conduit means interposed therebetween.

To insure proper circulation, it is imperative that direct communication be prevented between the incoming coolant and the discharging coolant. Toward this end, a leak proof contact between the hoop opening and the pressure vessel outlet nozzle is required. However, although a leak proof contact is necessary to prevent direct fluid communication, structural and differential thermal expansion conditions which can occur between the internal reactor structures and the pressure vessel must be considered. In general, the attendant thermal expansion precludes fixedly joining the conduit means to both the hoop and the pressure vessel wall. Therefore, a leak proof sealing means, either as part of the conduit or in substitution thereof, is required to prevent the commingling of the inlet fluid coolant and the outlet fluid coolant. Further, from a structural consideration it is desirable that the sealing means segregate the fluid coolants without structurally coupling the hoop to the pressure vessel.

In the past, a leak proof seal was established by a spring biased contact of a sealing ring or by thermal expansion contact of the conduit. In general, the thermal expansion contact seal consists of carefully and tediously machining the conduit or a ring to be attached thereto to establish a designed clearance or tolerance between the machined conduit or ring face and the pressure vessel nozzle during assembly. The leak-proof condition, however, for this thermal expansion type seal is only achieved at the elevated operating temperatures of the nuclear reactor system when thermal expansion of the hoop and conduit expand to meet the inner wall of the pressure vessel. Moreover, since the pressure vessel also expands during operation, this thermal expansion conduit-seal generally requires a material having a greater thermal expansion coefficient for the hoop and/or the conduit than the expansion coefficient of the pressure vessel, if the leak proof state is to be achieved.

The spring contact type seal, moreover, comprises a cylindrically shaped sealing member disposed within and extending from a cylindrical annular cavity concentric therewith. The sealing member is generally machined on one face of its cylindrical shape in order to nestle in close contact with, for example, the pressure vessel wall about the outlet nozzle and thereby prevent leakage therebetween. A spring disposed within the annular cavity interposed between the other face of the cylindrical sealing member and the rear wall of the cavity, or a compression ring, exerts in the axial direction the force necessary to tightly seat the sealing member against the pressure vessel wall. Moreover, to prevent leakage flow from one fluid from traveling through the annulus, between the sealing member and the annular cavity, and across the spring into communication with the other fluid, both the sealing member and the cavity are machined to exact close fitting tolerances such that the sealing member is tightly seated in the cavity. However, the seating or mating of the seal ring to the cavity, even with the strict matching of machining tolerances of the slideably engaging members, produces a narrow gap therebetween. Moreover, although this narrow gap provides a labyrinth-like flow passage, the high differential pressures encountered within a pressure vessel enhance fluid leakage flow therethrough and establish fluid communication between the inlet and outlet coolants. Therefore, flow leakage or fluid communication between the coolants is not prevented but merely reduced by this type of seal. Moreover, from a cost efficient viewpoint, this leakage rate is too large and the machining tolerances are too stringent for economic justification of this type seal.

Accordingly, there is a need to provide a sealing means which will prevent or at least reduce the leakage flow between the incoming and discharging coolants at all operating conditions without the stringent manufacturing tolerances, or the use of different materials having different thermal coefficients that are characterized by the prior art systems.

SUMMARY OF THE INVENTION

In accordance with the invention, a reactor pressure vessel-hoop discharge sealing means is provided which eliminates costly machining, removes the thermal expansion determination of the sealing means-pressure vessel clearance, allows a wider selection of materials for the hoop and/or sealing means and establishes a satisfactory leak proof seal in all reactor conditions, operating or during shut down, without structurally coupling the distribution hoop to the pressure vessel.

Specifically, a reactor pressure vessel-hoop discharge nozzle sealing means that has these features comprises a sealing ring biased against the hoop opening or the pressure vessel by an elastically responsive member and connected thereto in a leak proof manner by a flexible ring.

More specifically, the coolant discharge opening seal comprises; an annular compression ring member seated, for example, in a recess about the hoop opening; a sealing ring slideably engaged therewith having a contact face surface for engagement with the pressure vessel about the outlet nozzle; a plurality of springs interposed between the sealing ring and the compression ring to effect the sealing engagement thereof with the hoop and/or the pressure vessel; and a flexible impervious ring member disposed about the sliding seal ring — compression ring connection and circumferentially seal welded at one end to the seal ring and at the other end to the compression ring effectively closing the leakage flow through the flow path formed by the mating members of the nozzle seal. In addition, the flexible impervious ring member is responsive to expansion and contraction of the nozzle seal without structurally coupling the hoop to the pressure vessel. Moreover, since the flexible ring member prevents flow leakage through the discharge opening seal, the machining of close tolerance slideably engaging members of the seal is not required. Therefore, from a cost efficient view, the excessive manufacturing costs of close tolerance engaging members as found in the prior art thermal expansion and spring type seals are eliminated. That is, the seal effectively prevents leakage independent of the size of the annular flow path formed by the mating members.

The various features of novelty which characterizes the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

FIG. 2 is a top view of a nuclear reactor pressure vessel outlet seal embodying principles of the invention showing a portion of the pressure vessel in section.

FIG. 3 is a section of the outlet seal taken along line 3—3 of FIG. 2.

DETAILED DESCRIPTION OF THE PREFERRED EMBODIMENTS OF THE INVENTION

Figure 1:
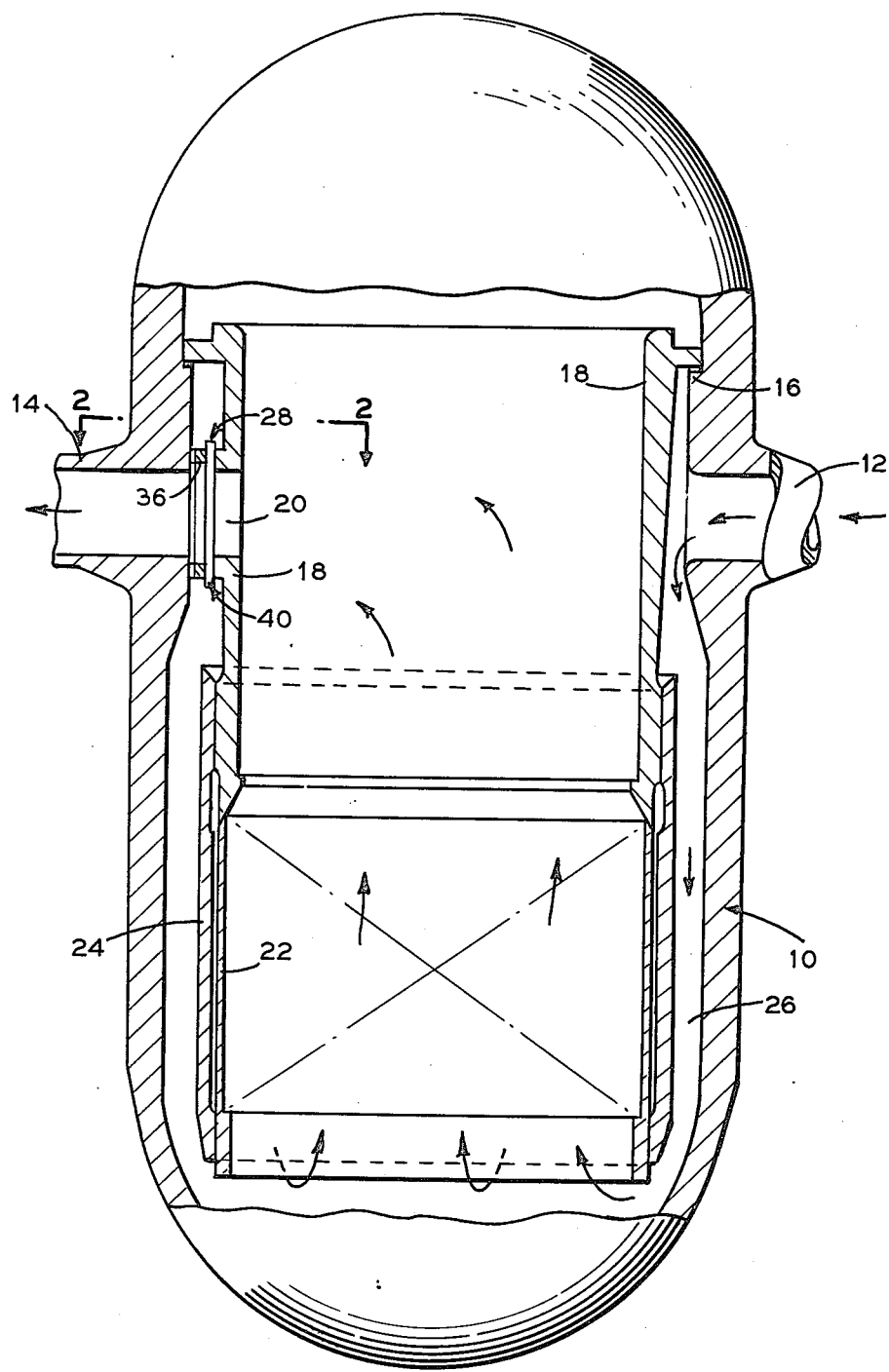
FIG. 1 shows an illustrative nuclear reactor pressure vessel in full section embodying principles of the invention.

For a more complete appreciation of the invention, attention is invited to the following description of an illustrative embodiment of the invention, as shown in the attached drawings.

In FIG. 1 there is illustrated a nuclear reactor pressure vessel 10 which has a longitudinally disposed cylindrical envelope closed at each end by a convex base and a domed roof. Reactor coolant inlet and outlet nozzles 12 and 14 respectively, protrude from the pressure vessel 10 near the domed roof. These nozzles are generally all disposed in the same plane, that is, transverse to the longitudinal axis of the cylindrical vessel and are separated from each other with an angular displacement. An annular flange 16 formed on the inner surface of the vessel 10 serves as a means for supporting a distribution hoop 18. The hoop 18 has an opening 20, for reactor coolant discharge, which is aligned with the outlet nozzle 14 in the vessel 10.

The distribution hoop 18 is extended by means of a skirt 22 and a thermal shield 24 which serve as a hydraulic guide for the incoming fluid coolant entering the annulus 26 formed between the hoop-skirt assembly and the pressure vessel wall from the inlet nozzle 12. Furthermore, the skirt 22 supports the fuel elements in the reactor core (not shown).

In operation, the coolant enters the pressure vessel 10 through the inlet nozzle 12 and flows downwardly through the annulus 26, rises through the reactor core (not shown) to the distribution hoop 18, whereupon the heated coolant is discharge from the vessel 10 through the opening 20 and the outlet nozzle 14.

As shown in FIGS. 2 and 3, the outlet nozzle 14 for the vessel 10 is in alignment with the opening 20 in the distribution hoop 18. An outlet nozzle seal 28 in accordance with this invention joins the hoop 18 to the vessel 10 or, more specifically, joins the hoop discharge opening 20 to the reactor pressure vessel outlet nozzle 14. As shown in this particular embodiment of the invention, the seal 28 is disposed within a recess 29 in the hoop 18 and circumferentially disposed about a retaining ring 31 in the hoop opening 20. Disposed within the recess 29 and extending outwardly therefrom is an annular ring shaped member or compression ring 30. Although shown here as a separate ring member, it is understood that the compression ring 30 may be readily fashioned in and from the hoop 18. Projecting outwardly from the compression ring 30 and generally axially therewith is a spring 32 which is disposed at one end in a recess 34 in the compression ring. A cylindrical seal ring 36 slideably engages and extends outwardly from the compression ring 30, and is biased therefrom by the spring 32 which is partially disposed in a recess 38 in the seal ring 36. In addition, disposed about the seal 28 in surrounding relation to the sliding connection between the seal ring 36 and the compression ring 30 is a flexible impervious ring shaped member 40 or leak restrainer. The leak restrainer 40 is circumferentially welded at one end 42 to the seal ring and at the other end 44 to the compression ring. In this way, the leak restrainer 40 sealably closes the leakage flow path through the seal ring — compression ring sliding engagement and across the spring. Inlet and outlet fluid coolant communication is thereby prevented by a leak proof seal in accordance with this invention, regardless of the size of the annular flow path formed by the seal ring — compression ring connection. That is, the effectiveness of the discharge seal seal is no longer dependent on the close tolerance matching of slideably engaging members.

The seal 28, or more specifically, the spring 32 is designed such that, in its assembled relationship with respect to the hoop opening 20 and the vessel nozzle 14, it forces the broad surface 46 of the seal ring 36 into sealing engagement with the reactor pressure vessel, about the nozzle 14, independent of reactor operation or thermal expansion. In addition, to aid in the leak prevention between the seal ring and the vessel and to resist wear, the pressure vessel about the outlet nozzle may be cladded with a wear surface, not shown.

In the embodiment of the invention shown in FIGS. 2 and 3, the flexible leak restrainer 40 has a generally channel shaped cross section, having two circumferential side walls 46 and 48 respectively and a retaining wall 50, which opens radially inwardly to receive and prevent the flow leakage through the seal. Although shown herein as having one convolution or channel shape, it is apparent to one skilled in the art that the leak restrainer 40 may be formed in any shape, e.g. a plurality of convolutions, which provides the flexible responsiveness required to accommodate seal ring movement imposed thereon by the spring in conjunction with the differential thermal expansion of the pressure vessel-hoop structure and/or by other loads. As shown, the circumferential side walls 46, 48 of the channel shaped leak restrainer 40 have their radially inward ends 42 and 44 deflected outwardly from the channel shaped cavity in general axial alignment with the seal ring and the compression ring respectively for welding thereto and to aid in the flexible expansion or responsiveness of the leak restrainer 40. Further, the seal ring 36 may be drilled radially to produce a flow passage 52 in direct communication with the leak restrainer 40 to prevent entrapment of radioactive materials and to enhance the equalization of pressure therein, for example, during start-up or shut down.

In accordance with this invention, flow communication between the incoming and outgoing coolants in the vicinity of the outlet nozzle 14 is prevented by the flexible leak restrainer circumferentially seal welded to both the seal ring and the compression ring, and, in addition, this fluid seal is independent of the flow path between the seal ring compression ring sliding engagement, thereby eliminating the need of costly machining thereof. Furthermore, the flexible responsiveness of the seal assures that the seal will not structurally couple the hoop to the pressure vessel.

What is claimed is:

1. A reactor system comprising a pressure vessel having inlet and outlet nozzles, a distribution hoop within said pressure vessel having a fluid passage opening in flow communication with a respective one of said inlet and outlet nozzles, sealing means disposed about said hoop opening and interposed between said hoop and said outlet nozzle to establish a leak-proof connection between said hoop and said nozzle, said sealing means having an annular cup shaped cross section compressing ring, a sealing ring in axial alignment with the compression ring, the sealing ring being slideably engaged within the cup shaped compression ring forming a restricted leakage flow passageway therethrough, a spring operatively disposed between said compression ring and said sealing ring to force the sealing ring into leak tight engagement with the outlet nozzle, and an impervious flexible leak restraining member disposed in space surrounding relation to the compression ring and the sealing ring and circumferentially seal welded thereto to prevent leakage flow through the passageway.

2. A system according to claim 1 wherein said sealing means further comprises a retaining ring concentrically disposed about the hoop opening and attached thereto.

3. A system according to claim 1 wherein said sealing ring slideably engages the compression ring and has a flow passage therethrough in direct flow communication with said leak restraining member.

4. A system according to claim 1 wherein said leak restraining member has a generally channel shaped cross section.

5. A system according to claim 1 wherein said leak restraining member comprises at least one convolution.

* * * * *